(12) United States Patent
Franck (10) Patent No.: US 11,408,614 B2
(45) Date of Patent: Aug. 9, 2022

(54) TEMPERATURE MANAGEMENT SYSTEM

(71) Applicant: Jan Franck, Weidenberg (DE)

(72) Inventor: Jan Franck, Weidenberg (DE)

( * ) Notice: Subject to any disclaimer, the term of this patent is extended or adjusted under 35 U.S.C. 154(b) by 0 days.

(21) Appl. No.: 16/537,891

(22) Filed: Aug. 12, 2019

(65) Prior Publication Data
US 2019/0360703 A1 Nov. 28, 2019

Related U.S. Application Data

(63) Continuation-in-part of application No. 14/908,615, filed as application No. PCT/IB2014/001404 on Jul. 29, 2014, now abandoned.

(30) Foreign Application Priority Data

Jul. 29, 2013 (DE) .................... 10 2013 012 436.0

(51) Int. Cl.
 *F24D 11/02* (2006.01)
 *F24D 11/00* (2022.01)
 *F24F 5/00* (2006.01)
(52) U.S. Cl.
 CPC ........ *F24D 11/0221* (2013.01); *F24D 11/003* (2013.01); *F24F 5/0046* (2013.01); *F24F 2005/0064* (2013.01); *F24F 2221/54* (2013.01)
(58) Field of Classification Search
 CPC .. F25D 11/0221; F25D 11/003; D24F 5/0046; D24F 2005/0064; D24F 2221/54
 See application file for complete search history.

(56) References Cited

U.S. PATENT DOCUMENTS

| | | | | |
|---|---|---|---|---|
| 3,339,629 A | * | 9/1967 | Hervey | F28D 20/0052 165/45 |
| 3,965,972 A | | 6/1976 | Petersen | |
| 3,996,759 A | * | 12/1976 | Meckler | F24F 5/0046 62/170 |
| 4,007,776 A | | 2/1977 | Alkasab | |
| 4,165,036 A | * | 8/1979 | Meckler | F24F 5/0046 237/1 R |
| 4,182,406 A | | 1/1980 | Holbrook et al. | |
| 4,270,522 A | * | 6/1981 | Vandenberg | F24D 11/003 126/594 |
| 4,809,523 A | * | 3/1989 | Vandenberg | F24D 11/0221 62/483 |
| 2011/0048409 A1 | * | 3/2011 | Messmer | F24S 80/56 126/663 |
| 2015/0168020 A1 | * | 6/2015 | Wehner | G05D 23/134 126/714 |
| 2016/0156309 A1 | * | 6/2016 | Almogy | F03G 6/065 136/248 |

* cited by examiner

*Primary Examiner* — Elizabeth J Martin
(74) *Attorney, Agent, or Firm* — Pandiscio & Pandiscio (57) ABSTRACT

A temperature management system for a private household or public building wherein there is one hot reservoir and one cold reservoir which are or can be coupled with at least one solar collector or outdoor heat exchanger that is installed outdoors for the purpose of heating or cooling the respective reservoir.

41 Claims, 3 Drawing Sheets

TEMPERATURE MANAGEMENT SYSTEM

REFERENCE TO PENDING PRIOR PATENT APPLICATIONS

This patent application is a continuation-in-part of pending prior U.S. patent application Ser. No. 14/908,615, filed Jan. 29, 2016 by Jan Franck for TEMPERATURE MANAGEMENT SYSTEM, which patent application in turn claims benefit of International (PCT) Patent Application No. PCT/IB2014/001404, filed Jul. 29, 2014 by Jan Franck for TEMPERATURE MANAGEMENT SYSTEM, which claims benefit of German Patent Application No. DE 10 2013 012 436.0, filed Jul. 29, 2013.

The three (3) above-identified patent applications are hereby incorporated herein by reference.

FIELD OF THE INVENTION

The invention is directed to a temerature management system, especially for a private household or a pubic building.

BACKGROUND OF THE INVENTION

The state of the art now includes hot water solar systems in which water heated by one or more solar collectors is used to heat or reheat a water supply in a hot water container through a spiral heat exchanger. The hot water container can, for example, be coupled with a central heating system that distributes the stored heat via radiators in the relevant apartment, as required.

For example, examples of so-called solar or sun heating systems in a number of variants are presented on page 743 of Volger, Karl: "Haustechnik" (*"Buildings Technology"*): FIG. 743.1 shows a system that is primarily used to generate hot water and FIG. 743.3 shows a solar absorber roof with heat pump for room heating.

One disadvantage of such installations is that such solar heating systems are comparatively elaborate and expensive and can be used only for heating purposes or, at most, also for generating hot water, whereas sometimes, namely on very hot days in particular, there is a need for cooling that such a solar heating system, by its very nature, is not able to satisfy.

Admittedly, there are air conditioning systems for this purpose which are installed in addition to the heating system already present. There are fairly small air conditioning devices, the installation of which requires that pipes and/or hoses be laid in addition to the pipes and hoses already present in the building for the heating system, whereby these additional pipes and/or hoses connect one or more indoor devices and at least one outdoor device, and there are also larger air conditioning systems which require that the air in the relevant rooms be circulated, whereby the exhaust air from the relevant rooms is either filtered and recirculated or else replaced by fresh additional air, which has to be pre-heated, possibly by using waste heat gained from the exhaust air. However, such air conditioning systems are very expensive and, since they are mostly in use for only a few weeks of the year, altogether unprofitable.

U.S. Pat. No. 4,809,523 discloses a fluid system for transferring heat from a solar collector to a hot water reservoir. The fluid pressure of the heat transfer medium at the high point of the system is maintained at a level such that the fluid vaporizes in the desired temperature operating range of the collector. The vapor collects in an accumulator that is connected in parallel in the heat transfer system with the collector. The accumulator serves to supply a regulated flow of vapor for motivating a vapor jet compressor-pump. This pump functions for the dual purposes of circulating the heat transfer fluid and as a vapor compressor for space cooling or the pumping of heat from the outside environment into the system to supplement the heat supplied by the collector. There are no valves for switching the structure of the circuit of the heat transfer medium between two different modes of operation; the circulation cannot be switched over from a daytime operation to a nighttime operation. Furthermore, all heat exchangers in the hot reservoir are drained by the same heat transfer medium circulating to and from the accumulator of the solar collector. The cold reservoir has only one single heat exchanger.

U.S. Pat. No. 4,165,036 discloses an air conditioning system utilizing subterranean heat, atmospheric heat, solar heat and auxiliary heat sources in combination with a reversible-cycle water source heat pump, by absorption of heat energy into a liquid and by applying said heat energy to the heat pump evaporator during a heating mode of operation in order to be absorbed by the refrigerant at low temperature, and later to be ejected by the heat pump condensor at a higher temperature. The heat is transported by recirculating air through the heat pump. Heated and chilled water is for the accumulated and stored in different reservoirs. Except one line of fresh water which can be heated via a heat exchanger in the hot reservoir but cannot be recirculated, all heat exchangers in the hot reservoir as well as in the cold reservoir are coupled so that there is only one common heat transfer medium, because there are no separated circuits for a first and a second heat transfer medium. Furthermore, as a true air conditioning system, the only influence on the temperature within a building or room is via air recirculated through the heat pump; there are no radiators in the form of wall-mounted radiators or stand-alone radiators to dissipate heat in a room or building.

US 2015/0168020 A1 discloses a temperature limiter for fluidic systems at a point in a fluidic system to below a predetermined temperature by cooling the fluid when needed and without requiring a separate cold fluid source. Therefore, only a hot water reservoir is installed, where the water is heated by use of a solar collector. Neither is a cold reservoir disclosed, nor a temperature management system for a private household or a public building; especially, there are no radiators disclosed.

The disadvantages of the state of technology described above result in the problem which initiated the invention, namely that of creating a temperature management system which is in a position not only to heat but also to provide for cooling of a private household or public building, as needed, without one having to procure and install an elaborate, expensive air conditioning system.

SUMMARY OF THE INVENTION

With a proper temperature management system, this problem can be solved through one hot reservoir and one cold reservoir which are or can be coupled with at least one solar collector or heat exchanger that is installed outdoors for the purpose of heating or cooling the respective reservoir. Here, the hot reservoir can be designed as a hot water container and the cold reservoir as a cold water container.

Thus there is not just one hot reservoir or hot water container as with conventional heating systems, but also one cold reservoir or cold water container in addition, so that the desired temperature is available for each use case at all times, and in particular so that cooling is possible even on hot days. In that two containers that are separated from each other are used to supply a medium with two different temperature levels, these containers are available for different applications at all times, independently of each other.

It has proven to be advantageous for the hot water container and the cold water container to be coupled or capable of being coupled to one or more common solar collectors and/or outdoor heat exchangers for the purpose of heating or cooling the respective water reservoir. This makes it possible for energy to be absorbed from or supplied to the environment. Whereas conventional solar collectors are optimized primarily for capturing as much solar radiation as possible and converting it to usable heat, heat exchangers also allow direct exchange of energy with a surrounding medium, in particular air or water. There are several ways in which one can arrange outdoor heat exchangers: they can be integrated with solar collectors or realized as heat exchangers that are separate from the solar collectors. Integration of a heat exchanger with a solar collector could be direct, in that the solar collector is designed without insulation, or indirect through a joint arrangement of coiled pipes of the solar collector and of the heat exchanger on a common frame. In the latter case, a coiled pipe of the outdoor heat exchanger could be installed on the reverse side of the coiled pipe of the solar selector, and these can then, for example, be connected in parallel or selectively, that is, separately from each other, in order to acccommodate the applicable requirements and environmental conditions.

Furthermore, one can use air heat exchangers installed outdoors, which are installed in the open and bathed only by air. On the other hand, these can also be designed for exchange of heat with the earth or ground water; a particularly efficient method would be to integrate them into a subterranean water cistern, where primary heat exchange with the contents of the water cistern is possible.

The solar collectors and outdoor heat exchangers in use should be capable of maximum heat exchange with their envirnoment, in particular designed without any insulation whatsoever. This certainly cannot be taken for granted in the case of solar collectors because they may well be thermally insulated for smooth operation during the winter.

The invention also provides that the pipe and hose lines between the solar collectors and/or outdoor heat exchangers on the one hand, and the hot water and/or cold water container on the other hand, are thermally insulated so that the heat that is released or absorbed is transported to the reservoir containers with as little loss as possible.

The pipe and hose lines between the solar collectors and/or outdoor heat exchangers on the one hand, and the hot water and/or cold water container on the other hand, should be thermally closed to form a circuit in which a heat transfer medium, preferably a liquid heat transfer medium, especially water, circulates. This makes it possible for energy to be transported without interruption.

It is part of the invention that at least one pump and/or at least one compressor is installed in a circuit for a heat transfer medium. This pump or compressor secures a defined circulation of the heat transfer medium.

The invention can be refined in that at least one expansion valve is installed in a circuit for a heat transfer medium. The structure of a heat pump is created when an expansion valve supplements a compressor; that is, when a compressor is installed upstream from a heat exchanger and an expansion valuve is installed downstream from this heat exchanger, then the pressure and with it, above all, also the temperature level at this heat exchanger can be raised, and with that a release of heat is initiated there.

If, conversely, an expansion valve is located upstream from a heat exchanger and a compressor downstream from this same heat exchanger, then the pressure in the area of this heat exchanger and with it also the temperature level is lowered, so that an absorption of heat is initiated there.

The pipes and hoses from/to the solar collectors and outdoor heat exchangers should be designed as pressure pipes/pressure hoses so that these—especially in the context of a heat pump structure—can be placed under pressure in order to bring about a release of heat at the solar collectors or heat exchangers.

For the same reason. the solar collectors and outdoor heat exchangers themselves should be designed to be compression-proof, for example for a pressure burden of up to 5 atm or more, preferably for a pressure burden of up to 10 atm or more, especially for a pressure burden of up to 20 atm or more.

In the interests of minimizing loss of heat, the invention recommends that the hot water container and/or the cold water container be designed for minimal heat exchange with their respective environments, and that they be, in particular, equipped with intensive thermal insulation. This thermal insulation should be conceived so well that once a temperature level has been achieved, it can be kept fairly stable for several hours, in particular for at least roughly 12 hours, that is, for example, the temperature should deviate by at most 5 degrees: $\Delta T \leq 5°$ C. for $\Delta t \leq 12$ hours, at least insofar as no heat is taken from or transferred to the container in question. This can be done, for example, by means of thermal insulation with so-called vacuum insulation panels, whereby an airtight hull, for example of aluminium or high barrier foil, is wrapped around a porous core and then evacuated after airtight sealing. There is no transport of heat within the evacuated pores, neither by convection nor conduction.

Further advantages result from the fact that the cold water container is installed underground, in particular in the form of a cistern. Then, the container is in direct contact with deeper layers of the earth which are not exposed to frost in the winter and which in the summer do not become warmer than approximately 10 to 15° C., which is much cooler than the heat of the air. For this reason, thermal insulation of such a cold reservoir is superfluous on the one hand, and on the other hand intensive thermal contact with the surrounding earth can even counteract heating of the contents of the container to more than the aforementioned 10 to 15° C. even if the air does not cool off during especially balmy summer nights, in which case the solar collectors and air heat exchangers according to the invention would not provide sufficient cooling.

The hot water container and/or cold water container should have a pressure compensating valve so that excessive pressure cannot build up as a result of temperature changes. On the other hand, it would also be possible not to fill these containers completely but to leave an air or gas bubble that can expand as needed. A pressure compensating container would also be conceivable.

On the other hand, it can be advantageous for the hot water container and/or the cold water container to be equipped with a refilling system or a level regulator. This allows one to ensure that the heat exchangers in the container are completely submerged and, secondly, an air bubble, insofar as desired, is kept in the container.

Furthermore, one can have the hot water container and/or the cold water container equipped with a temperature regulator. Then, one is pursuing the objective of maintaining a temperature level inside the container which is or can be prescribed.

In the context of such a temperature regulation, a regulator can operate on a servo component in the form of a pump or a compressor in order to influence the flow rate or velocity within a circuit and in this way control or regulate the heat being transported. A circuit between the container in question and a solar collector or external heat exchanger is to be preferred for such regulation.

The hot water container and/or the cold water container should have a heating or cooling spiral through which the heat transfer medium circulates for the purpose of heat exchange.

Although the feeding circuits of the two containers could indeed be separated from each other, so that completely different media could circulate in them (for example, water with an antifreezing agent in the cuircuit of the cold water container and oil in the circuit of the hot water container, this is not to be regarded as being preferable. For the option of coupling to the same solar collectors or outdoor heat exchangers is greatly facilited by use of a single heat transfer medium. The invention recommends water or oil for this purpose, possibly with additives such as antifreezing agents. This also allows for direct coupling between the two containers, as is explained in greater detail below.

The hot water container according to the invention should be fitted with a heating spiral that is installed in its lower area. The heated reservoir liquid rises from there within the container to the top, where the heat stored in it can be extracted directly via another connection or via a heat exchanger.

The cold water container, on the other hand, should be fitted with a cooling spiral that is installed in its upper area. The cooled reservoir liquid sinks from there within the container to the bottom and collects there, that is, preferably in the lower area, where heat dissipation through secondary heat exchangers is possible or the cool liquid can be siphoned off.

The invention recommends that the discharge of a pump or a compressor be directed toward a hot water container. When such a conveyance facility is located upstream from a hot water container, and, on the other hand, an expansion valve downstream from the hot water container, then the temperature will be raised there; that is, this will cause release of heat to the reservoir liquid of the hot water container.

Another construction regulation says that the discharge of a pump or compressor is to be directed away from a cold water container. If, accordingly, such a conveyance facility is located downstream from a cold water container and, on the other hand, an expansion valve is installed upstream from the cold water container, then the temperature within the cooling spiral of the cold water container goes down, thus bringing about absorption of heat by the reservoir liquid of the cold water container.

With one (a daytime) operating mode, heat is transported from one or more solar collectors and/or outdoor heat exchangers to the hot water container.

With another (a nighttime) operating mode, on the other hand, heat is transported from the cold water container to one or more solar collectors and/or outdoor heat exchangers.

Moreover, one can run a mxed operating mode in which heat is transported directly from the cold water container to the hot water container, especially via a heat pump.

One or more radiators can be connected to the hot water container, especially by means of a spiral heat exchanger installed in the hot water container, through which a heat transfer medium, preferably a liquid heat transfer medium, circulates in order to distribute the heat from the hot water container to one or more radiators. The radiators can be wall-mount radiators and/or stand-alone radiators. Preferably, each radiator may have an upper manifold and a lower manifold which are connected by several channels arranged in parallel.

On the other hand, it is also possible that one or more hot water consumers are connected to the hot water container, either directly or by means of a heating spiral installed in the hot water container, through which water flows or through which a heat transfer medium, preferably a liquid heat transfer medium, circulates in order to distribute the heat from the hot water container to one or more hot water consumers, for example to a warm shower, a hot water tap in the kitchen, etc.

Yet another possibility is that one or more radiators are also attached to the cold water container, in particular through a cooling spiral installed in the cold water container, through which a heat transfer medium, preferably a liquid heat transfer medium, circulates in order to transport the heat absorbed by the radiators to the cold water container. With that, a pleasant indoor temperature can be maintained on warm and hot days.

Finally, the invention's doctrine allows for one or more cold water consumers to be connected to the cold water container either directly, so that the cooled reservoir liquid is directed in the form of cold water to a consumer, for example a cold shower, or indirectly by means of a spiral heat exchanger installed in the cold water container, through which water flows or through which a heat transfer medium, preferably a liquid heat transfer medium, circulates in order to direct the heat from one or more cold water consumers, for example of a cold shower, to the cold water container.

BRIEF DESCRIPTION OF THE DRAWINGS

Further attributes, details, advantages and effects on the basis of the invention are implied by the following description of a preferred embodiment of the invention as well as on the basis of the drawing, whereby.

DETAILED DESCRIPTION OF THE PREFERRED EMBODIMENTS

Figure 1:
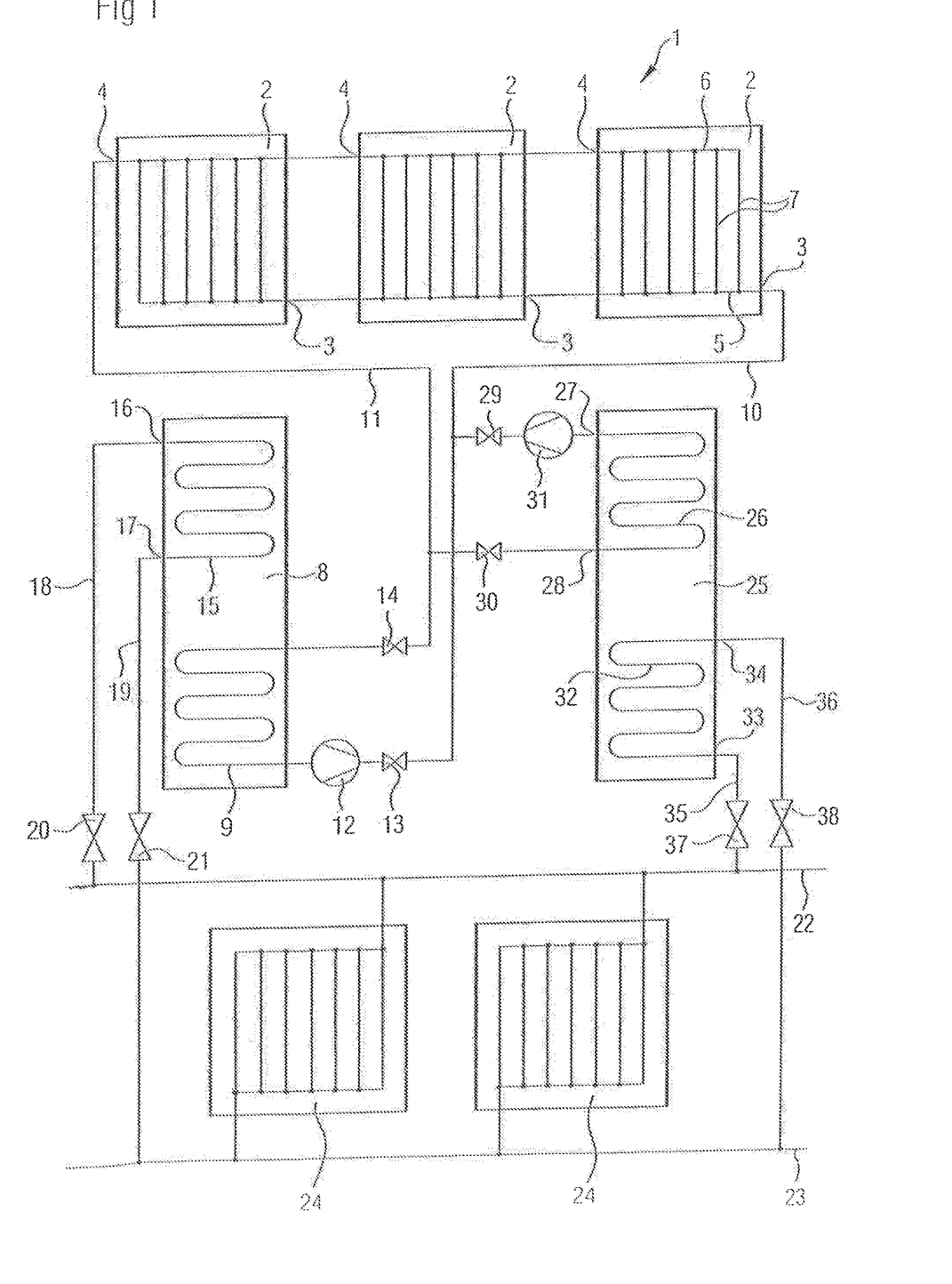
FIG. 1 shows a first embodiment of the invention in a schematic view.

The underlying principle of the invention can be seen in the attached FIG. 1, which schematically reflects part of a building installation, namely a Temperature Management System 1.

On the roof of the building in question there is one, or preferably two or more solar collectors 2, each with at least one supply point 3 and at least one return point 4. For each collector there is also just one supply rail 5 and just one return rail 6 internal to it, and these are connected with each other by several parallel ribbon conductors 7. Two or more solar collectors are connected with each other in that their supply rails 5 are connected with each other on the one hand, and their return rails 6 are connected with each other on the other hand, so that altogether, i.e. over all solar collectors, there is just one common supply rail and just one common return rail, whereby the ribbon conductors 7 are all connected in parallel.

As is generally customary with hot water solar systems, the ribbon conductors 7 are flowed through upward because the medium that is heated in them rises.

The solar collectors 2 should not be thermally insulated from their surroundings. They can, for example, have a metal plate which can be blackened and with which the ribbon conductors 7 are in thermal contact.

As is customary for solar heating, the solar collectors 2 are coupled with one hot reservoir 8, which is usually designed as a hot water container. The latter contains, preferably in its lower area, a heat exchanger 9, preferably in the form of coiled tubing. This heat exchanger 9 is connected with the row of solar collectors 2 by means of one supply pipe 10 and one return pipe 11, resulting in a closed loop for a heat transfer medium. A pump 12 or a compressor is provided to keep the heat transfer medium flowing.

The heat transfer medium flowing in a circuit is preferably liquid, especially water. It can contain an antifreezing agent so that its permissible temperature range also covers outdoor temperatures under 0° C. and/or it can be kept under pressure so that it stays in liquid form even if it heats up to temperatures above 100° C., as could happen, for example, if a circulation pump were to fail.

Circulation can be interrupted by means of valves 13, 14.

The hot reservoir 8 is preferably thermally insulated, for example by means of vacuum insulation panels, and can be provided with a pressure equalizer, for example a pressure relief valve to the atmosphere. Level measurement can likewise be provided, as can a temperature measurement at one or more places in the hot reservoir 8.

The upper area of the hot reservoir 8 contains a second pipe coil as a second heat exchanger 15. Its two connector ends 16, 17 are connected via one pipe 18, 19 each and one shut-off device 20, 21 each with one distribution rail 22, 23 each, to which one or more, preferably all, of the household's radiators 24 are attached. Thermostats, which are not included in the diagram, can be used to control flow through the radiators 24 individually, in accordance with actual heating requirements. The radiators 24 are designed as indoor heat exchangers and can be wall-mount or stand-alone types.

Also, warm water can be heated by or diverted from the hot reservoir 8, say for hot water for the kitchen or bathroom. This is not included in the diagram.

Furthermore, the hot reservoir 8 can be provided with supplementary heating, for example in the form of a gas burner, oil burner or the like.

The system components described above are suitable only for heating the rooms in the household and for generating hot water. Cooling with the components described above would be just as unlikely as nighttime operations, inasmuch as the sun does not shine during the night, whence the hot reservoir 8 could not be reheated by the solar collectors 2.

However, if the hot reservoir 8 is sufficiently large, for example with a volume of 1,000 liters or more, preferably with a volume of 2,000 liters or more and especially with a volume of 4,000 liters or more, and if moreover it has optimal thermal insulation, and if it has been heated to a temperature of, for example, 50° C. or more, preferably 60° C. or more, then it might be able to keep its temperature overnight, maintaining its heating operations until the next morning. Conventional solar collectors 2 would be inactive during the night.

However, the system according to the invention also has a cold reservoir 25, likewise preferable in the form of a water tank or a container, whereby the water in it, which serves as a heat storage medium, preferably also contains an antifreezing agent so that it stays in its liquid state even at temperatures well under 0° C. Basically, the cold reservoir 25 can have the same construction as the hot reservoir 8, that is, for example, it can have thermal insulation, a pressure equalizer or relief, a refilling system, level measurements and possibly one or more sensors for measuring the temperature in its interior.

A heat exchanger 26 in the form of a pipe coil or the like is installed in the upper area of the cold reservoir 25 and its connector ends 27 and 28 are connected via one valve 29, 30 each or other shut-off device with the supply and return pipe respectively so that after the valves 13 and 14 have been closed and the valves 29 and 30 opened, circulation through the solar collectors 2 no longer continues through the heat exchanger 9 in the hot reservoir 8, but through the heat exchanger 26 in the cold reservoir 25. The heat transfer medium can then be kept in motion by a further pump 31 or a compressor.

With that, a so-called night operations mode is possible, as follows:

When the valves 13, 14 are closed during the night and the hot reservoir 8 is working in full storage mode, the valves 29, 30 are opened so that now the cold reservoir 25 communicates with the solar collectors 2. The solar collectors 2 are not insulated and can even be designed as heat exchangers which, for example, exchage heat with the surrounding air.

When the outdoor temperature has gone down at night, for example to 10° C. or below, pump 31 is turned on and now the heat transfer medium circulates back and forth between the heat exchanger 26 and the solar collectors 2 within the circuit 10, 11. In doing so, this medium—preferably water—cools off in the solar collectors 2 or external heat exchangers accordingly and when it flows back to and enters the heat exchanger 26 of the cold reservoir 25, it extracts energy from the cold reservoir, which energy is in turn released in the solar collectors 2 or external heat exchangers. Thus the cold reservoir 25 can be cooled, in any case to the outdoor temperature near the solar collectors 2.

When the outdoor temperature rises again in the morning, the valves 29, 30 are closed again and the cold reservoir 25 switches to storage mode while the hot reservoir 8 is connected with the solar collectors again when the valves 13, 14 are opened again. It is advisable not to turn on the pump 12 31 during a certain transition time but to wait until the temperature of the heat transfer medium in the solar collecors 2 has reached the temperature level in the connected hot or cold reservoir 8, 25.

Thus there are actually four operating modes, namely, in addition to day and night operations there is also a morning and an evening mode, whereby certain valves 13, 14, 29, 30 can be opened, but neither pump 12 nor pump 31 is activated while the hot reservoir could be cooled or the cold resevoir warmed.

The cold reservoir 25 also has a second heat exchanger 32, preferably likewise in the form of a pipe coil, in particular in the lower area of the cold reservoir 25. As is the case with the hot reservoir 8, the cold reservoir 25 can likewise take the form of a somewhat cylindrical vessel standing upright. The two connector ends of the second heat exchanger 32 in the cold reservoir 25 are connected via one of the pipes 35, 36 each and one shut-off device 37, 38 each with one of the two heating distribution rails 22, 23 to which one or more, preferably all, of the radiators 24 of the household are attached.

Thermostats, not shown here, can be used to regulate the flow through the radiators 24 individually, in accordance with current requirements for cooling. Since the heat transfer medium in the circuit 22, 23 33, 34, 35, 36 is at a low temperature level, for example at 10° C. or below, the so-called radiators are not used to heat the rooms but to cool them off, i.e. they absorb heat and take it away to the cold reservoir 25, the temperature of which rises slowly.

However, if the cold reservoir 25 is sufficiently large, for example with a volume of 1,000 liters or more, preferably a volume of 2,000 liters or more, especially with a volume of 4,000 liters or more, and if moreover it has optimal thermal insulation, and it it has been cooled during the night to a temperature of, for example, 10° C. or lower, preferably 5° C. or lower, then it might be able to keep its temperature during the day, and maintain its cooling operations during the day and especially throughout the afternoon.

Also, cold water can be generated by or diverted from the cold reservoir 25, say for cold water for kitchen or bathroom. This is not included in the diagram.

One can see from FIG. 1 that the fot reservoir 8 as well as the cold reservoir 25 has two heat exchangers 9, 15; 26, 32. While the heat exchangers 9 and 26 may be coupled only to the solar collectors 2, but never to the indoor heat exchangers or radiators 24, the heat exchangers 15 and 32 may be coupled only to the indoor heat exchangers or radiators 24, but never to the solar collectors 2. Therefore, there are two circuits entirely seperated from another. In the first circuit, consisting of the radiators 24 and heat exchangers 15, 32, as well as pipes 22, 23, a first heat transfer medium can circulate, and in the second circuit, consisting of the solar collectors 2 and heat exchangers 9, 26, as well as pipes 10, 11, a second heat transfer medium can circulate.

As both circuits are completely seperated from each other, the first and second heat transfer media can be different liquids, they can have different temperatures and pressures, and they may have different flow parameters like flow velocities and quantities. For example, the flow in the solar collectors can be zero while the flow in the circuit of the indoor heat exchangers is not zero, and vice versa.

Figure 2:
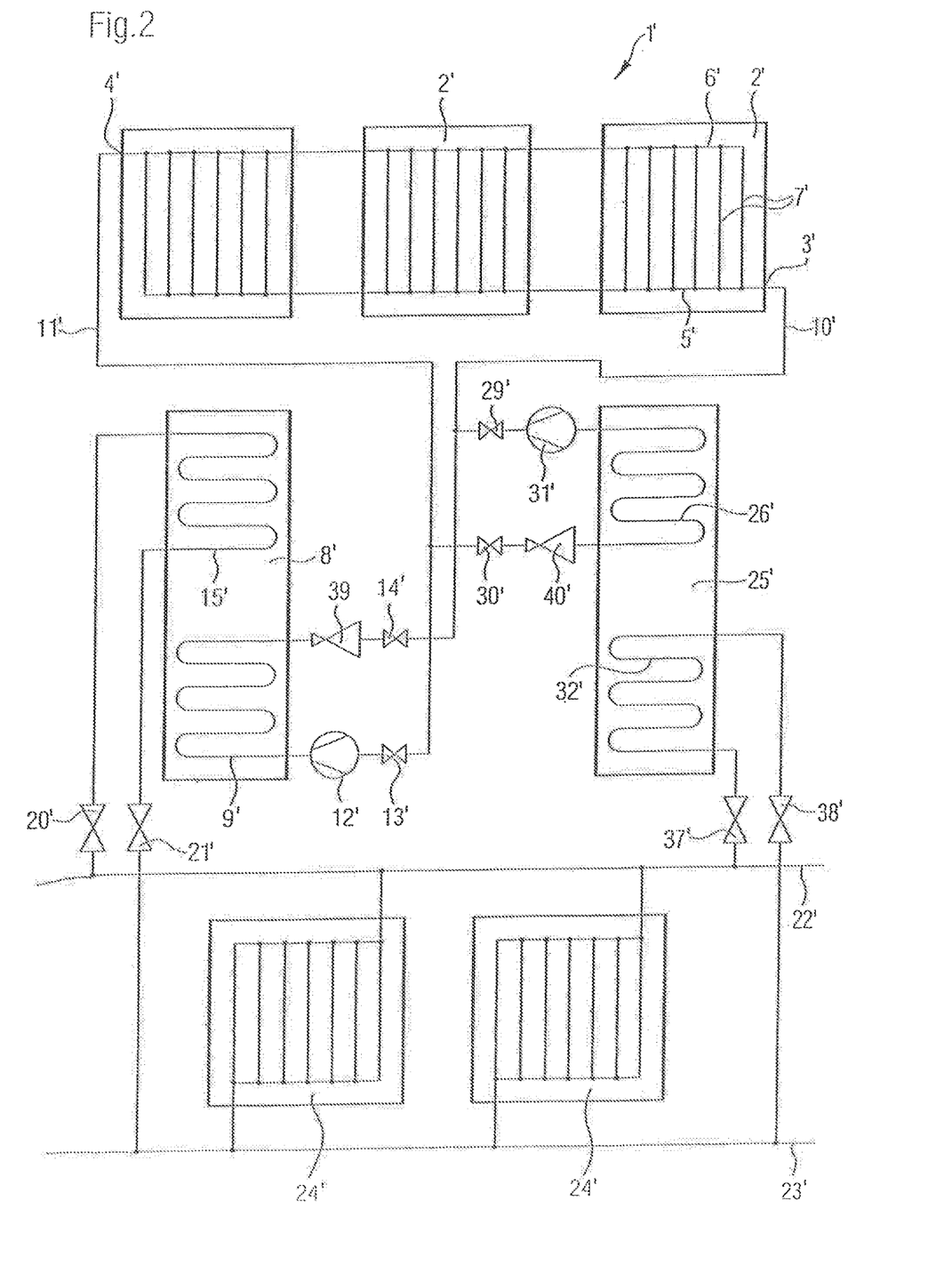
FIG. 2 shows a second embodiment of the invention in a representation which corresponds to FIG. 1.

The embodiment 1' according to FIG. 2 has undergone a few, but functionally especially advantageous changes relative to the embodiment according to FIG. 1.

The changes pertain solely to the circuit through the solar collectors 2'. This circuit then uses a heat transfer medium which evaporates when heat is supplied at low pressure but then condenses again after compression to higher pressure and release of heat. Thus operation like that of a heat pump is possible.

Compressors 12', 31' are used for this purpose instead of pumps 12, 31, and in addition a throttle or expansion valve 39, 40 is used on the other side of the relevant heat exchanger 9', 26'.

If the valves 29', 30' are closed and the valves 13', 14' are open, then the heat transfer medium is compressed by the compressor 12' and condenses with release of heat in the heat exchanger 9' being operated as a condenser. The medium undergoes a reduction of pressure in the valve 39 and the expanded medium ultimately evaporates with absorption of heat in the solar collectors 2' being operated as vaporizers. The advantage of this arrangement is that heat transport during the day from outdoors to indoors also works when the outdoor temperatures are relatively low.

Night operations, when the valves 13', 14' are closed and the valves 29', 30' are open, proceed similarly. The compressor 31', in contrast to the compressor 12', is installed so that it exerts a compressing effect on the medium flowing to the solar collectors 2', which releases heat to condense in the solar collectors 2' being operated as a condenser. The medium, which is still flowing, ultimately undergoes a reduction of pressure in the valve 40 and the expanded medium then absorbs heat to evaporate in the heat exchanger 26', which is being operated as a vaporizer.

The advantage of this arrangement is that the heat transport during the night from indoors to outdoors also works when the outdoor temperatures are relatively high, as during a balmy summer night. Even with outdoor temperatures such as 15° C. or higher, it is still possible to cool the cold reservoir 25' to 5° C. or lower; if antifreezing agents are used, temperatures within the cold reservoir could conceivably even lie under 0° C.

Figure 3:
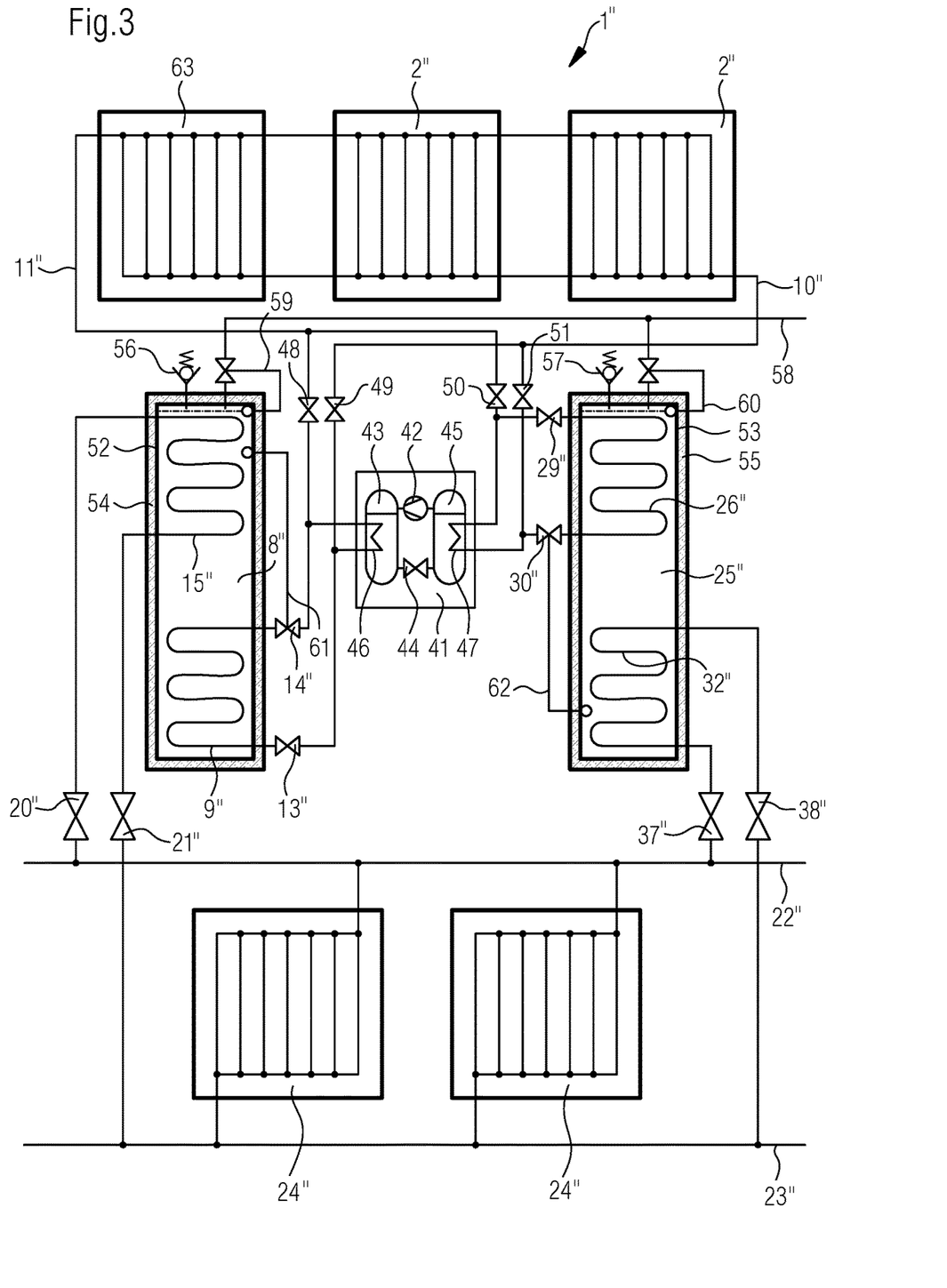
FIG. 3 shows a third embodiment of the invention in a representation which corresponds to FIG. 1.

FIG. 3 depicts an improved embodiment of a temperature management system 1" according to the invention which is based on the arrangement of FIG. 2 and also works in accordance with the heat pump principle. However, here there is a total of only one single heat pump 41 with one compressor 42, one condensation container 43, one expansion valve 44 and one evaporation container 45, which are connected in this order with each other to form a circle.

The condensation container 43 contains a heat exchanger 46, for example in the form of a pipe coil, which can be coupled via valves 13", 14" with the heat exchanger 9" within the hot reservoir 8".

In a similar way, the evaporation container 45 has a heat exchanger 47 for example in the form of a pipe coil, which can be coupled via valves 29", 30" with the heat exchanger 26" within the hot reservoir 25".

The supply and return pipes 10, 11 to and from the solar collectors 2" can be connected via the valves 48, 49 with the heat exchanger 46 in the condensation container 43 or via the valves 50, 51 with the heat exchanger 47 in the evaporation container 45.

Various operating modes are possible, depending on whether the valves 13", 14", 29", 30", 48, 49, 50, 51 are open or closed.

With normal daytime operation, the valves 13", 14" and 50 and 51 are open and the remaing valves are closed—the hot reservoir 8" is charged via the solar collectors 2". The compressor 41 and/or additional circulation pumps are open in full daytime operation but still closed during preparatory morning operation.

With the nighttime operation described above, the valves 29", 30", 48 and 49 are open and the other valves are closed—the cold reservoir 25" is cooled off via the solar collectors 2" or external heat exchangers. The compressor 41 and/or further circulation pumps are on during full nighttime operation, but are still closed during preparatory evening operation.

In addition, this temperature management system 1" also allows a so-called fifth operating mode. It's defining characteristic is that the valves 13", 14" and 29" and 30" are open while the other valves 48 to 51 are closed. Now the two reservoirs, namely the hot reservoir 8" and the cold reservoir 25", are coupled directly with each other via the heat pump 41, i.e. the hot reservoir 8" is heated and at the same time the cold reservoir 25" is cooled.

This mixed operating mode is frequently advisable when a reservoir has not yet been charged and at the same time the other reservoir is already partly discharged. This frequently happens when the weather changes, for example when a cold day is followed by a mild night, so that due to the ongoing heating during the day the hot reservoir was not charged sufficiently, and, at the same time, the cold reservoir was not able to cool off fast enough during the evening.

The advantage of such a mixed operating mode is that there is no exchange of heat with the atmosphere but that instead of this, the heat pump's entire output can be used in its entirety.

Completely independent of the selection between daytime operation and nighttime operation is the selcetion between heating mode and cooling mode. While the first is affected by the circuit of the solar collectors 2,2',2" and the regarding valves 13, 14, 29, 30 in lines 10, 11, the latter is affected by the circuit of the indoor heat exchangers or radiators 24,24', 24" and the regarding valves 20, 21, 37, 38 in lines 22, 23.

For example, during a cold winter night, the radiators 24 can be in heating mode, i.e. can be coupled to the hot reservoir 8 to receive the heat stored in hot reservoir 8, while at the same time the solar collectors 2 can be used as outdoor heat exchangers being coupled to the cold reservoir 25 for cooling that down. On the other hand, at a hot summer day, the radiators 24 can be in cooling mode, i.e. can be coupled to the cold reservoir 25 to transfer heat to the cold reservoir 25, while at the same time the solar collectors 2 are used to heat the hot reservoir 8. This complex function is permitted by the two reservoirs 8, 25 which are accessible by two circuits completely separated from each other.

In FIG. 3, additionally, the following elements can be seen:

The hot reservoir 8" is contained within a hot water container 52, which in turn is surrounded by a thermal insulation 54.

A pressure compensating valve 56 in the hot reservoir 8" limits the pressure inside of the hot reservoir 8".

The cold reservoir 25" is enclosed in a cold water container 53, and a thermal insulation 55 surrounds the cold water container 53.

The pressure in the cold reservoir 25" is maintained at a tolerable level by a pressure compensating valve 57.

A refilling system 58 is provided for a refilling of one or both of the hot reservoir 8" and the cold reservoir 25".

As a part of such a refilling system 58, there can be further provided a level regulator 59 in the hot reservoir 8", and/or a level regulator 60 in the cold reservoir 25".

Furthermore, the purpose of a temperature regulator 61 in the hot reservoir 8" is to keep the temperature in the hot reservoir 8" as constant as possible.

In the same way, a temperature regulator 62 in the cold reservoir 25" renders the temperature in the cold reservoir 25" as constant as possible.

Finally, at least one heat exchanger 63 installed outdoors can be combined with one or more solar collectors 2".

REFERENCE SIGNS

| | |
|---|---|
| 1 | Temperature Management System |
| 2 | solar collector |
| 3 | supply point |
| 4 | return point |
| 5 | supply rail |
| 6 | return rail |
| 7 | ribbon conductor |
| 8 | hot reservoir |
| 9 | heating coil |
| 10 | supply pipe |
| 11 | return pipe |

-continued

| | |
|---|---|
| 12 | pump, compressor |
| 13 | valve |
| 14 | valve |
| 15 | heat exchanger |
| 16 | connector end |
| 17 | connector end |
| 18 | pipe |
| 19 | pipe |
| 20 | shut-off device |
| 21 | shut-off device |
| 22 | distribution rail |
| 23 | distribution rail |
| 24 | radiator |
| 25 | cold reservoir |
| 26 | cooling coil |
| 27 | connector end |
| 28 | connector end |
| 29 | valve |
| 30 | valve |
| 31 | pump, compressor |
| 32 | heat exchanger |
| 33 | connector end |
| 34 | connector end |
| 35 | pipe |
| 36 | pipe |
| 37 | shut-off device |
| 38 | shut-off device |
| 39 | expansion valve |
| 40 | expansion valve |
| 41 | heat pump |
| 42 | compressor |
| 43 | condensation container |
| 44 | expansion valve |
| 45 | evaporation container |
| 46 | heat exchanger |
| 47 | heat exchanger |
| 48 | valve |
| 49 | valve |
| 50 | valve |
| 51 | valve |

The invention claimed is:

1. A temperature management system (1;1';1") for a private household or a public building, the temperature management system (1;1';1") comprising:
  a) a hot reservoir (8;8';8"),
  b) a cold reservoir (25;25';25"),
  c) at least one solar collector (2) or at least one outdoor heat exchanger installed outdoors, which is or can be coupled either to the hot reservoir (8;8';8") or to the cold reservoir (25;25';25"), for the purpose of heating or cooling the respective reservoir (8,25),
  d) a heating spiral (9;9';9") in the hot reservoir (8;8';8"),
  e) a first, inwardly linked heat exchanger (15) installed inside the hot reservoir (8;8';8"),
  f) a second, inwardly linked heat exchanger (32) installed inside the cold reservoir (25; 25'; 25"),
  g) at least one indoor heat exchanger (24) installed indoors but outside the hot reservoir (8;8';8") and outside the cold reservoir (25;25';25"), the at least one indoor heat exchanger (24) being coupled or being able to be coupled either to the first, inwardly linked heat exchanger (15) inside the hot reservoir (8;8';8"), or to the second, inwardly linked heat exchanger (32) inside the cold reservoir (25; 25'; 25") via a first circuit in the form of a closed loop for a first heat transfer medium that circulates or is able to circulate between the at least one indoor heat exchanger (24) and one of the first, inwardly linked heat exchanger (15) and the second, inwardly linked heat exchanger (32) inside the cold reservoir (25; 25'; 25"), h) a cooling spiral (26;26';26") in the cold reservoir (25;25';25"),
i) a second heat transfer medium that circulates in a second circuit through the heating spiral (9;9';9") or through the cooling spiral (26;26';26"),
j) valves (13,14;29,30;13',14';29',30';13",14";29",30") which can be set so that the second circuit for the second heat transfer medium from the at least one solar collector (2) or the outdoor heat exchanger is closed either in a daytime operation via the heating spiral (9;9';9") in the hot reservoir (8;8';8") or else in a nighttime operation via the cooling spiral (26;26';26") in the cold reservoir (25;25';25");
k) whereby in the daytime operation heat is transported from the at least one solar collector (2;2';2") or the at least one outdoor heat exchanger to the hot reservoir (8;8';8");
l) while in the nighttime operation heat is transported from the cold reservoir (25;25';25") to the at least one solar collector (2;2';2") or to the at least one outdoor heat exchanger;
m) but where the circuit of each of the at least one solar collector (2) or of each of the at least one outdoor heat exchanger is always entirely separated from each of the at least one indoor heat exchanger (24).

2. The temperature management system (1;1';1") according to claim 1, comprising valves (20,21,37,38;20',21',37', 38';20",21",37",38") which can be set so that the circuit of the at least one indoor heat exchanger (24) for the first heat transfer medium is closed either in a heating operation via the first, inwardly linked heat exchanger (15) in the hot reservoir (8;8';8") or else in a cooling operation via the second, inwardly linked heat exchanger (32) inside the cold reservoir (25;25';25").

3. The temperature management system (1;1';1") according to claim 2, wherein in the heating operation heat is transported from the hot reservoir (8;8';8") to the at least one indoor heat exchanger (24).

4. The temperature management system (1;1';1") according to claim 2, wherein in the cooling operation heat is transported from the at least one indoor heat exchanger (24) to the cold reservoir (25;25';25").

5. The temperature management system (1;1';1") according to claim 2, wherein the switchover between the daytime operation and the nighttime operation via the valves (13,14; 29,30;13',14';29',30';13",14";29",30") can be controlled independent from the switchover between the heating operation and the cooling operation via the valves (20,21,37,38; 20',21',37',38';20",21",37",38").

6. The temperature management system (1;1';1") according to claim 2, wherein the at least one indoor heat exchanger (24) is designed as a radiator.

7. The temperature management system (1;1';1") according to claim 6, wherein all of the at least one indoor heat exchangers (24) are designed as wall-mounted radiators or as stand-alone radiators.

8. The temperature management system (1;1';1") according to claim 1, wherein the flow of the first heat transfer medium through each indoor heat exchanger (24) or radiator can be controlled independently of the flow of each other indoor heat exchanger (24).

9. The temperature management system (1;1';1") according to claim 1, wherein the flow of the first heat transfer medium through each indoor heat exchanger (24) or radiator can be controlled independently of the flow of the second heat transfer medium.

10. The temperature management system (1;1';1") according to claim 1, wherein one or both of the first heat transfer medium and the second heat transfer medium is/are liquids.

11. The temperature management system (1;1';1") according to claim 1, wherein the hot reservoir (8;8';8") is designed as a hot water container.

12. The temperature management system (1;1';1") according to claim 1, wherein the heating spiral (9;9';9") in the hot reservoir (8;8';8") is installed in the lower area of the hot reservoir (8;8';8").

13. The temperature management system (1;1';1") according to claim 1, wherein the internal heat exchanger (15) in the hot reservoir (8;8';8") is in the form of a spiral.

14. The temperature management system (1;1';1") according to claim 13, wherein the internal heat exchanger (15) in the hot reservoir (8;8';8") is installed in the upper area of the hot reservoir (8;8';8").

15. The temperature management system (1;1';1") according to claim 13, wherein the internal heat exchanger (15) in the hot reservoir (8;8';8") is installed above the heating spiral (9;9';9").

16. The temperature management system (1;1';1") according to claim 1, wherein the cold reservoir (25;25';25") is designed as a cold water container.

17. The temperature management system (1;1';1") according to claim 1, wherein the cooling spiral (26;26';26") in the cold reservoir (25;25';25") is installed in the upper area of the cold reservoir (25;25';25").

18. The temperature management system (1;1';1") according to claim 1, wherein the internal heat exchanger (32) in the cold reservoir (25;25';25") is in the form of a spiral.

19. The temperature management system (1;1';1") according to claim 18, wherein the internal heat exchanger (32) in the cold reservoir (25;25';25") is installed in the lower area of the cold reservoir (25;25';25").

20. The temperature management system (1;1';1") according to claim 18, wherein the internal heat exchanger (32) in the cold reservoir (25;25';25") is installed below the cooling spiral (26;26';26").

21. The temperature management system (1;1';1") according to claim 1, wherein the cold reservoir (25;25';25") is installed underground.

22. The temperature management system (1;1';1") according to claim 21, wherein the cold reservoir (25;25';25") is installed underground as a cistern.

23. The temperature management system (1;1';1") according to claim 1, wherein the hot reservoir (8;8';8") and the cold reservoir (25;25';25") are coupled or are capable of being coupled to several common solar collectors (2;2';2") or outdoor heat exchangers for the purpose of heating or cooling the respective reservoir.

24. The temperature management system (1;1';1") according to claim 1, wherein pipes (10,11;10',11';10",11") which extend between the solar collectors (2;2';2") or the outdoor heat exchangers on the one hand and one of the hot reservoir (8;8';8") and the cold reservoir (25;25';25") on the other hand are thermally insulated.

25. The temperature management system (1;1';1") according to claim 1, wherein pipes (22,23;22',23';22",23") which extend between the at least one indoor heat exchanger (24) on the one hand and at least one of the hot reservoir (8;8';8") and the cold reservoir (25;25';25") on the other hand are thermally insulated.

26. The temperature management system (1;1';1") according to claim 1, wherein at least one pump (12,31;12',31'; 12",31") or at least one compressor are installed in at least one of the circuit for the first heat transfer medium and the circuit for the second heat transfer medium.

27. The temperature management system (1;1';1") according to claim 1, wherein at least one expansion valve is installed in the circuit for the second heat transfer medium.

28. The temperature management system (1;1';1") according to claim 1, wherein one or more of the solar collectors (2;2';2") and the outdoor heat exchangers are designed to be pressure-resistant for a pressure burden of up to 5 atm or more.

29. The temperature management system (1;1';1") according to claim 28, wherein one or more of the solar collectors (2;2';2") and the outdoor heat exchangers are designed to be compression-proof for a pressure burden of up to 10 atm or more.

30. The temperature management system (1;1';1") according to claim 1, wherein one or both of the hot reservoir (8;8';8") and the cold reservoir (25;25';25") are equipped with a thermal insulation.

31. The temperature management system (1;1';1") according to claim 1, wherein one or more of the hot reservoir (8;8';8") and the cold reservoir (25;25';25") are provided with a pressure compensating valve.

32. The temperature management system (1;1';1") according to claim 1, wherein one or both of the hot reservoir (8;8';8") and the cold reservoir (25;25';25") are equipped with a refilling system.

33. The temperature management system (1;1';1") according to claim 32, wherein one or both of the hot reservoir (8;8';8") and the cold reservoir (25;25';25") are equipped with a level regulator.

34. The temperature management system (1;1';1") according to claim 1, wherein one or both of the hot reservoir (8;8';8") and the cold reservoir (25;25';25") are equipped with a temperature regulator.

35. The temperature management system (1;1';1") according to claim 34 wherein the temperature regulator operates as a servo component on the at least one pump (12,31;12',31';12",31") or on the at least one compressor in the circuit for the second heat transfer medium.

36. The temperature management system (1;1';1") according to claim 35, wherein the flow from the at least one pump (12,31;12',31';12",31") or from the at least one compressor in the circuit for the second heat transfer medium is directed toward the hot reservoir (8;8';8").

37. The temperature management system (1;1';1") according to claim 35, wherein the flow from the at least one pump (12,31;12',31';12",31") or from the at least one compressor in the circuit for the second heat transfer medium is directed away from the cold reservoir (25;25';25").

38. The temperature management system (1;1';1") according to claim 1, comprising a heat pump (41) with two pairs of inputs and outputs wherein each pair can be coupled with a heating coil (9") in the hot reservoir (8") or with a cooling coil (26") in the cold reservoir (25") or with a supply pipe (10") to and with a return pipe (11") from one or more of the at least one solar collector (2;2';2") and the at least one outdoor heat exchanger.

39. The temperature management system (1;1';1") according to claim 38, comprising a mixed operation in which there is a transport of heat directly from the cold reservoir (25;25';25") to the hot reservoir (8;8';8") via the heat pump (41).

40. The temperature management system (1;1';1") according to claim 1, wherein one or more hot water consumers are connected to the hot reservoir (8;8';8") via a third, inwardly linked spiral heat exchanger which is installed in the hot reservoir (8;8';8") and through which water flows from a supply line to one or more hot water consumers.

41. The temperature management system (1;1';1") according to claim 1, wherein one or more cold water consumers are connected to the cold reservoir (25;25';25") via a fourth, inwardly linked spiral heat exchanger which is installed in the cold reservoir (25;25';25") and through which water flows from a supply line to one or more cold water consumers.

* * * * *